United States Patent [19]
Jaffee et al.

[11] 3,721,349
[45] March 20, 1973

[54] PORTABLE TRAY CART

[75] Inventors: Robert D. Jaffee, Skokie; Ralph B. Olson, Lombard, both of Ill.

[73] Assignee: Amco Wire Products Corp., Chicago, Ill.

[22] Filed: June 18, 1971

[21] Appl. No.: 154,405

[52] U.S. Cl..............................211/126, 280/79.3
[51] Int. Cl................................................A47f 3/14
[58] Field of Search......211/126, 133, 128, 134, 148; 312/351; 280/79.3

[56] References Cited

UNITED STATES PATENTS

| | | | |
|---|---|---|---|
| 2,257,188 | 9/1941 | Page | 211/133 |
| 2,489,708 | 11/1949 | Hammer | 312/351 |
| 2,886,186 | 5/1959 | Hamilton | 211/126 |
| 3,178,198 | 4/1965 | Hamilton | 280/79.3 |

Primary Examiner—Ramon S. Britts
Attorney—Mueller and Aichele

[57] ABSTRACT

A portable tray cart has a first set of rails for supporting a first tray and a second set of rails positioned in a spaced relation below the first set of rails for supporting a second tray. The first set of tray support rails has upwardly extending supports which fit into a recessed bottom in the tray to hold the same in a fixed position on the cart. A flange portion about the top of the tray has projections which fit into apertures in the second set of rails for supporting the second tray in a fixed position below the first tray. Each of the trays has the projections and recessed bottoms so they can be used interchangeably with the first and second set of rails.

9 Claims, 3 Drawing Figures

PATENTED MAR 20 1973

INVENTORS.
ROBERT D. JAFFEE
RALPH B. OLSON
BY Mueller, & Aichele
ATTORNEYS.

PORTABLE TRAY CART

BACKGROUND OF THE INVENTION

Various types of tray cars have been proposed for use in restaurants for transporting used dishes and utinsels to the kitchen. For the most part the trays are fixed to the cart, and dish and cup racks and the like are set on top of the fixed shelves to receive the used plates and utensiles. These types of carts are unpleasing to the eye and therefore can seldom be used in the better types of restaurants. They also present a problem because the dishracks and the like which are set on the fixed cart trays can slide off as the cart is being pushed around causing breakage. In other types of carts deep trays or racks are permanently fixed to the cart and the dishes and utensils are inserted therein for transportion from the dining area to the kitchen. This, however, is also undesirable because of the difficulty which is encountered in unloading the dirty dishes and utensils from the fixed racks into portable racks for placing them in the dishwasher.

SUMMARY OF THE INVENTION

It is an object of this invention to provide an improved tray cart for use in restaurant service.

It is a further object of this invention to provide a tray cart which supports a plurality of deep trays which are removably positioned on the cart and are interchangeable with one another.

It is still another object of this invention to provide a tray cart which is usable in dining rooms in fine restaurants yet is sufficiently flexible to permit easy removal of the dirty dishes and utensils from the cart and into the dishwasher.

In one embodiment of this invention a portable tray cart for supporting two trays includes first tray supporting means comprising first and second rails which are connected to the cart frame. Upright members are positioned on opposite ends of each of the rails and form a substantially square configuration. The bottom of each of the trays which is to be supported by the cart has a substantially square recessed portion which has a depth greater than the height of the upright members and which is dimensioned slightly larger than the square formed by them. Either one of the two trays can be selectively mounted to the first tray support means of the cart by fitting the recessed portion of the bottom of the selected tray over the upright members.

Each of the trays besides having identical recessed bottom portions also have a flange which extends completely about the top of the walls defining the tray opening. Four projections are integrally molded with the flange, one extending therefrom on each side of the tray. The second tray support means on the cart is positioned in a spaced relation to the first tray support means and also includes first and second rails which are connected to the cart frame. Intermediate the ends of the rails are apertures for receiving the projections on the tray flange. A selected tray may then be set into the tray cart by inserting any two oppositely disposed projections into the apertures in the second support rails.

The top tray is removed by simply lifting the same off the upright members. The bottom tray is removed by lifting the projections out of the apertures and sliding the flange of the tray along each of the rails until the tray is clear of the cart frame.

DETAILED DESCRIPTION

Figure 2:
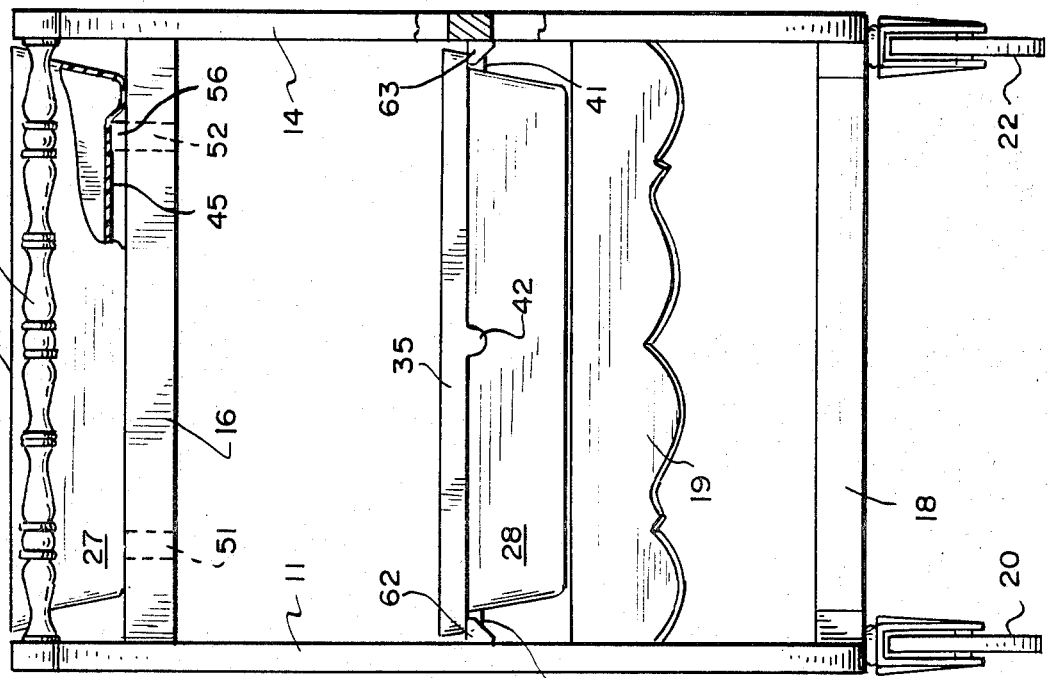
FIG. 2 is an end elevation view partially broken away of the cart shown in FIG. 1.
Figure 1:
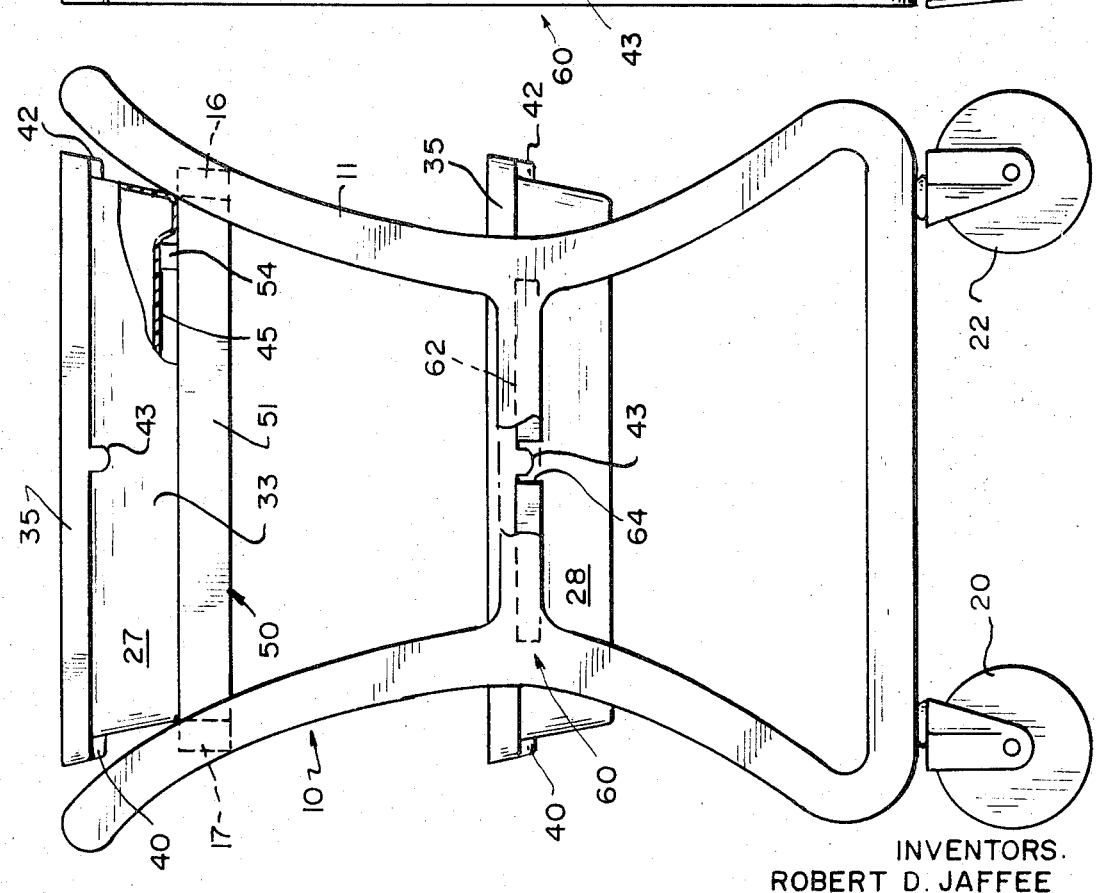
FIG. 1 is a side elevation view partially broken away showing the trays mounted to the cart in accordance with this invention.
Figure 3:
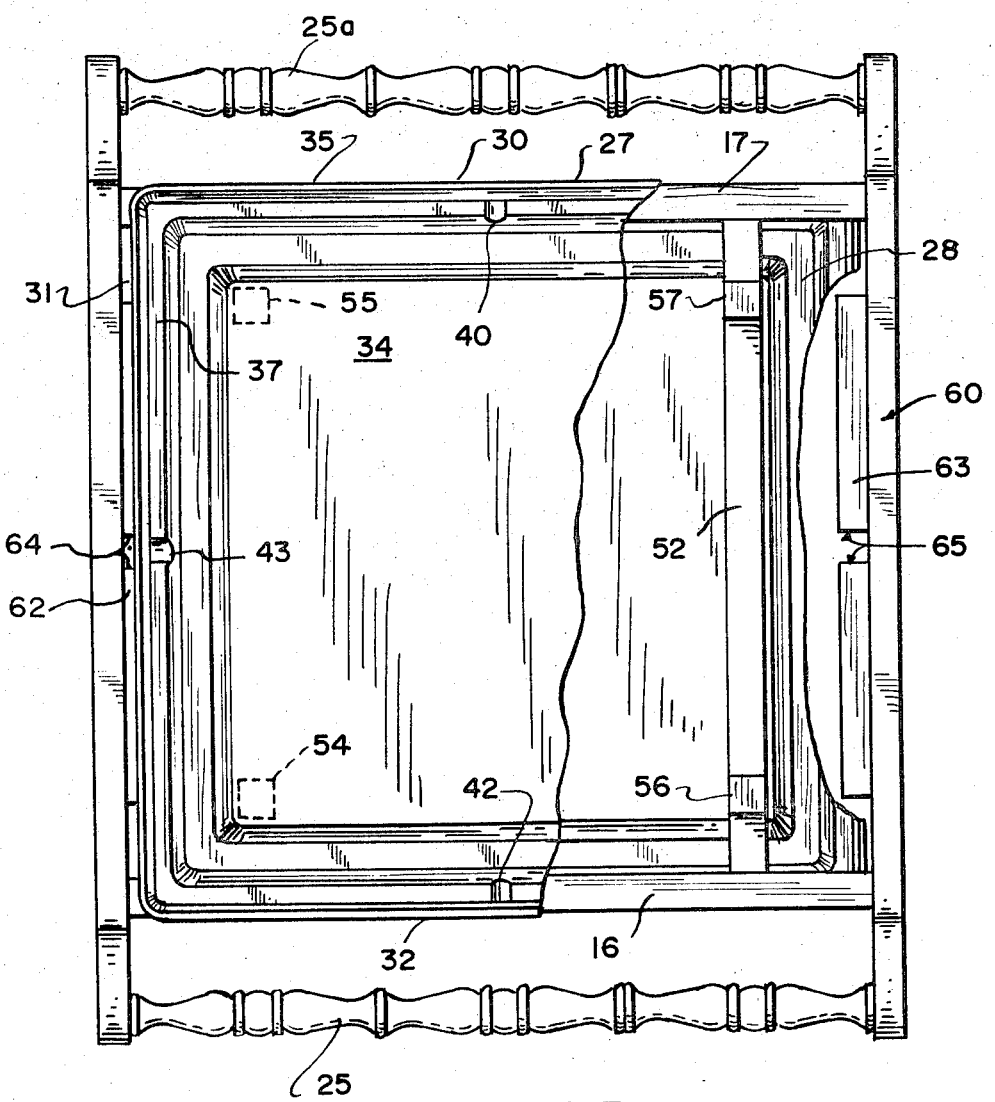
FIG. 3 is a top plan view partially broken away of the cart of FIG. 1.

Referring to FIGS. 1–3, there is shown a tray cart 10. The cart frame includes first and second side members 11 and 14 which are joined together in a rigid structure by transverse support members 16, 17 and 18, with the fourth support member at the bottom of the frame being concealed by support 18 in FIG. 2. Across each end of the cart there is connected a member 19 which in addition to adding extra support to the frame also establishes the esthetic mood of the cart. The cart is mounted on two sets of casters 20 and 22 so that it may be easily moved about the room by the two handles 25 and 25a (FIG. 3) positioned on either end of the cart.

This particular tray cart 10 has provisions for supporting two trays 27 and 28. Each of the trays has four side walls 30, 31, 32 and 33 which are joined by a bottom portion 34 to complete a tray which has depth, for instance, on the order of 4 to 5 inches. A stepped flange portion 35 is integrally molded about the tops of the tray walls to define the opening into the tray. As can be best seen in FIG. 3, the flange is stepped from the tray walls to form a ledge or shelf 37 completely about the periphery of the tray. This shelf 37 provides a support for a dish or cup rack on the top of the tray if one desires to use the same in conjunction therewith. That is, at times it may be desirable, rather than to place the used dishes and utensils directly into the trays 27 and 28, to place separate dish and cup racks onto the ledge 37. The used dishes are subsequently placed in the racks with the food scraps and liquid reminants being permitted to fall through the racks down into the trays.

Each of the trays has projections 40, 41, 42 and 43 on the respective sides integrally molded with and extending downwardly from the tray flange 35. Likewise as can best be seen in FIGS. 1 and 2 each tray has a recessed bottom portion 45.

Tray cart 10 has first tray support means 50 which includes first and second support rails 51 and 52 connected to the cart frame. Near each of the ends of the rails 51 and 52 are small upright members 54, 55 and 56, 57 respectively. As shown in FIG. 3, these upright members or posts generally define a square. The recessed base portion 45 of the tray also generally approximates a square as can best be seen in FIG. 3, which is dimensioned slightly greater than the square defined by the upright support members. Furthermore, the base is recessed to a depth which is slightly greater than the height of the upright members with the tray sitting in position on the support rails 51 and 52. It can be seen, therefore, that either the tray 27 or 28 can be set on the first support means of the tray cart 10 and the upright members 54–57 will interlock with the recessed portion 45 of the tray base to securely position the tray on the support rails.

A second tray support means 60 is positioned in a speced relation below the first tray support means 50 and also includes first and second rail members 62 and 63. Each of the rails 62 and 63 of the second tray support includes a notch or projection receiving aperture 64 and 65, respectively. The tray 28 is supported by the rails 62 and 63 with the flange 35 of the tray resting on the respective rails and with two oppositely disposed projections 41 and 43, for instance, engaging the notches to form an interlock for holding the tray 28 securely in position on the support rails.

The versatility of the tray support cart 10 and trays 27 and 28 should now be readily apparent. For instance, because each of the trays has a projection extending from the tray flange on each of the sides no matter how the tray is inserted into the second tray support means of the cart, two of the oppositely disposed projections will fit into the support rails to hold the tray in position. Furthermore, each of the trays has these molded projections so that either the tray 27 or 28 may be inserted into the tray support 60. In like manner because both trays have the recessed bottom portion 45, either may be inserted onto the tray support 50 and held in place by the upright members 54–56.

In addition to its versatility due to the interchangeable trays the cart is also advantageous from the standpoint that the the trays may be easily removed therefrom for emptying. For instance, the tray 27 merely needs to be lifted off the projections. The bottom tray 28 is lifted slightly and pulled toward the operator thereby causing the projections to ride up onto the rails. The tray is then moved along the rails until it is almost clear of the cart at which time it is easy for the operator to grasp both ends of the tray and remove it.

What is described, therefore, is an improved tray cart which is pleasing to the eye and which supports a plurality of trays which are conveniently, removably positioned on the cart and are interchangeable with one another.

We claim:

1. A tray support including in combination, first and second trays, a support frame, first tray support means integral with said frame and having first interlocking means, second tray support means integral with said frame and having second interlocking means, said first tray support means being spaced from said second tray support means, first interlock cooperating means located at a first predetermined position on each said tray, and second interlock cooperating means located at a second predetermined position on each said tray, said first predetermined position being located on each said tray at a position different from said second predetermined position, said first tray being positioned on one of said first and second tray support means with one of said first and second interlock coopeRating means coacting with one of said first and second interlocking means to fix said tray to the selected one of said first and second tray support means, and said second tray being positioned on the other one of said first and second tray support means with the other one of said first and second interlock cooperating means coacting with the other one of said first and second interlocking means to fix said second tray to the other one of said first and second tray support means.

2. The tray support of claim 1 wherein said first tray support means includes first and second rails oppositely disposed from one another and connected to said frame, and said first interlocking means includes upright members positioned on opposite ends of each rail, said upright members substantially forming a square, and said first interlock cooperating means on each said tray includes the tray bottom having a substantially square recessed portion, said square recessed portion being dimensioned slightly greater than said square defined by said upright members and being recessed to a depth greater than the height of said upright members, whereby one of said first and second trays is selectively positioned on said first tray support means with said recessed bottom portion being fitted over and interlocking with said upright members to fix said selected tray in position thereon.

3. The tray support of claim 2 wherein said second tray support means includes first and second rails oppositely disposed from one another and connected to said frame, and said second interlocking means includes projection receiving means intermediate the ends of each said rail, each said tray being defined by four walls and a bottom section and including a flange portion about the top of the walls defining the tray opening, and said second interlock cooperating means includes projection means extending from the flange portion, whereby the other one of said first and second trays is selectively positioned on said second tray support means with said projection means on said flange portion fitting into said projection receiving means in said rails with the same interlocking to fix said other selected tray in position thereon.

4. The tray support of claim 3 wherein said second interlock means includes a projection extending from said flange at each of the four sides of each said tray defining oppositely disposed pairs of projections with the spacing between said oppositely disposed pairs being equal, whereby said selected tray is set onto the tray support on said first and second rails with any two oppositely disposed projections fitting into said projection receiving means.

5. The tray support of claim 3 wherein said tray is removed from said second tray support means by lifting said projection means from said projection receiving means and sliding said flange portion along said first and second rails.

6. The tray support of claim 1 wherein said first tray support means includes first and second rails oppositely disposed from one another and connected to said frame, and said first interlocking means thereof includes upright members positioned on opposite ends of each rail, said upright members substantially forming a square, each said tray being defined by four walls and a bottom section and including a flange portion about the top of the walls defining the tray opening, said first interlock cooperating means on each said tray includes the tray bottom having a substantially square recessed portion, said square recessed portion being dimensioned slightly greater than said square defined by said upright members and being recessed to a depth greater than the height of said upright members, whereby one of said first and second trays is selectively positioned on said fiRst tray support means with said recessed bottom portion being fitted over and interlocking with said upright members to fix said selected tray In position, and said second tray support means includes third and fourth rails oppositely disposed from one another and connected to said frame, said third and fourth rails being positioned below said first and second rails in a spaced relation thereto for fitting the other tray below said first selected one on said tray support, said second interlocking means of said second tray suppoRt means includes projection receiving means intermediate the ends of each said third and forth rails, and said second interlock cooperating means includes a projection extending from said flange at each of the four sides of each said tray and oppositely disposed from one another, whereby the tray other than said selected tray is set onto the tray support on said third and fourth rails with any two oppositely disposed projections fitting into said projection receivIng means.

7. The tray support of claim 6 wherein the tray support is a moveable cart.

8. A tray in combination with a tray cart which has first and second tray support levels, said first level including a plurality of upright members, said second level including first and second oppositely disposed rail members supported by the cart each of the rail members including projection receiving means, the tray including in combination, four sides joined to a bottom section defining a tray having an open end and a predetermined depth, a flange portion about the perimeter of the open end, said flange portion including projection means comprising a projection extending from said flange at each of the four sides defining oppositely disposed pairs of projections with the spacing between said oppositely disposed pairs being equal, said bottom section including a recessed portion, said tray being selectively mounted to said first support level with the upright members thereof extending into said recessed portion of said bottom section to fix the tray in position, and the same being mounted to said second support level with said flange portion being supported by said second tray support level and with any two oppositely disposed projections fitting into said projection receiving means to fix the tray in position.

9. The tray of claim 8 wherein the tray cart includes the first tray support level comprising first and second oppositely disposed rail members supported by the cart, each rail member having first and second upright members positioned at opposite ends thereof defining substantially a square, the tray further including said recessed bottom portion having a depth greater than the height of each of the upright members, said recessed portion having substantially a square shape and being dimensioned slightly larger than the square defined by the upright members, said tray being set into the cart on the rails of the first tray support level with the upright members extending into the recessed portion of the bottom section to hold the tray in position.

* * * * *